(No Model.)

R. W. BAYLOR.
Pliable Coupling for Pipes.

No. 243,192.    Patented June 21, 1881.

Witnesses:
Geo. W. Miatt
M. L. Adams.

Inventor:
Robert W. Baylor,
Per Edw. E. Quimby,
Atty.

UNITED STATES PATENT OFFICE.

ROBERT W. BAYLOR, OF JERSEY CITY, ASSIGNOR TO SAMUEL T. WILLIAMS, OF RED BANK, NEW JERSEY.

PLIABLE COUPLING FOR PIPES.

SPECIFICATION forming part of Letters Patent No. 243,192, dated June 21, 1881.

Application filed October 20, 1880. (No model.)

*To all whom it may concern:*

Be it known that I, ROBERT W. BAYLOR, of Jersey City, New Jersey, have invented certain Improvements in Pliable Couplings for Pipes, of which the following is a specification.

It is the object of my improvement to provide yielding couplings for pipes deposited upon uneven surfaces, such as beds of rivers; and my invention consists in connecting two sections of iron pipe with an intermediate section of corrugated lead pipe. By corrugating the lead pipe I make all parts of its periphery both extensible and contractible in a longitudinal direction, and the result therefore is that if the surface upon which the pipe is deposited is uneven the corrugated lead couplings yield in the necessary direction and permit the iron sections to adjust themselves to the irregularities of the bed upon which they are deposited.

In carrying out my invention I construct a hollow cylindrical core-box, the central portion of which is circumferentially grooved, and I support within the core-box a correspondingly-grooved tin core, preferably made in two or more pieces for convenience of removal. I make the diameter of the core-box large enough to loosely admit the ends of the iron sections of pipe, and, having supported the iron sections of the pipe therein, pack the space between the surfaces of the pipes and the ends of the core-box with clay or other suitable material, and then pour melted lead into the annular space between the tin core and the core-box and between the inclosed ends of the iron sections of the pipe and the core-box. Upon cooling, this lead adheres closely to the exterior of the iron sections, and upon the removal of the tin core and the core-box I then have the two iron sections firmly connected together with a lead pipe having a series of circumferential corrugations. The thickness of the shell of the lead pipe I regulate with reference to the amount of pressure which it is to sustain, making it, of course, thicker for a higher pressure, and not so thick if the pressure is to be less.

Figure 1:
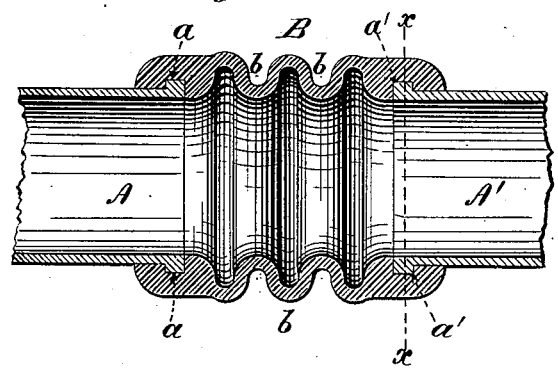
Figure 2:
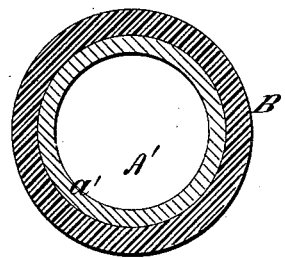

In the accompanying drawings, representing a pliable joint embodying my invention, Figure 1 is a longitudinal section, showing the two end portions of the iron pipe and the connecting lead pipe. Fig. 2 is a transverse section through the line $x \, x$ on Fig. 1, showing the overlapped portion of the lead pipe and the end of the iron pipe.

On reference to the drawings it will be seen that the iron pipes A and A' are each outwardly flanged at the end, and that the lead coupling-pipe B incloses a portion of each of the pipes A and A' within the end flanges $a$ and $a'$, and is thus prevented from being pulled off from the iron pipe. The middle portion of the lead pipe is provided with the circumferential corrugations $b$, for the purpose of permitting the bending of the joint, and also providing for the extensibility thereof.

What I claim as my invention, and desire to secure by Letters Patent of the United States, is—

The extensible pipe herein described, which consists of a section of lead pipe cast over the outwardly-flanged ends of two sections of iron pipe, and having a series of circumferential corrugations formed in its periphery, substantially as shown and described.

ROBT. W. BAYLOR.

Witnesses:
ASA FARR,
CHAS. MORRILL.